United States Patent Office 2,917,823
Patented Dec. 22, 1959

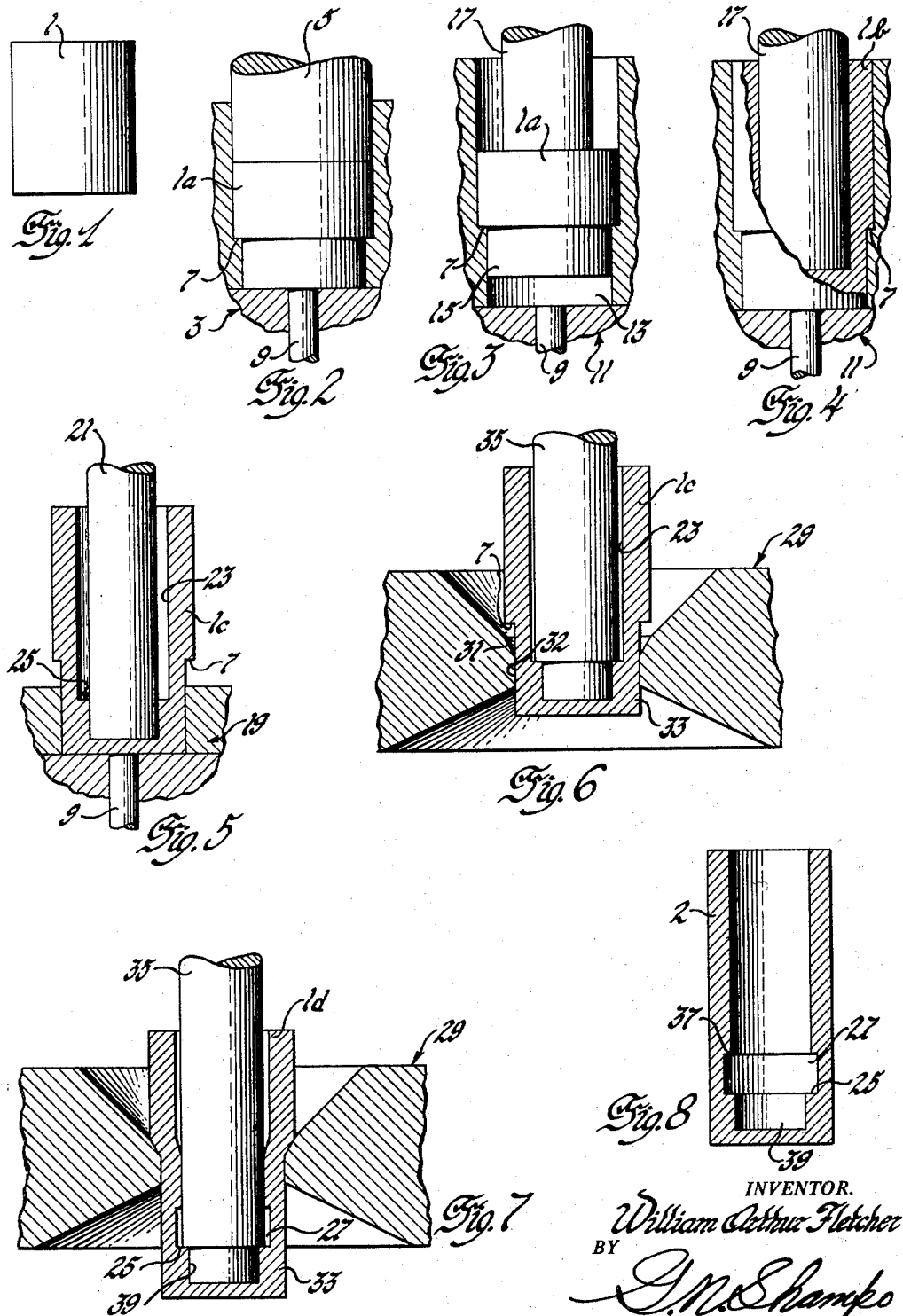

2,917,823

METHOD OF COLD FORMING TUBULAR BODIES HAVING INTERNAL UNDERCUT GROOVES

William Arthur Fletcher, Grand Rapids, Mich., assignor to General Motors Corporation, Detroit, Mich., a corporation of Delaware Application December 9, 1957, Serial No. 701,396

2 Claims. (Cl. 29—553)

This invention relates to a method for cold forming tubular bodies having internal undercut grooves and more particularly to a method for forming hydraulic valve lifter bodies.

It has been accepted practice in the art to form tubular bodies having internal undercut grooves by machining methods such as drilling bar stock and machining the undercut in the inside wall surface or by extruding the tubular member from a metal disk, the undercut being made by conventional machining operations. Such operations have become expensive and time consuming, especially in connection with the manufacture of hydraulic valve lifter bodies, such devices being required in extremely high volume.

It is therefore an object of my invention to provide a method for forming tubular devices having internal undercuts by cold forming operations exclusively. It is a further object of my invention to provide a method for forming hydraulic valve lifter bodies having internal undercut grooves by sequential extrusion and drawing operations.

These and other objects of my invention are achieved by extruding a steel slug to form a tubular member having a bore closed at one end and having a large diameter upper portion and a small diameter lower portion thus providing the outer surface with a shoulder, and moving the tube through a draw die to transfer the excess material above the shoulder to the inside surface to form the undercut.

A clear understanding of my invention will be had from the following description read in conjunction with the drawing in which Figure 1 represents a solid cylindrical steel slug from which the tubular body is formed; Figure 2 is a partial sectional view of a first stage die and cooperating punch with the steel slug of Figure 1 positioned therein after the extrusion operation; Figure 3 is a partial sectional view of the die cavity and cooperating punch with the extruded steel slug of Figure 2 positioned therein preparatory to a second extrusion operation; Figure 4 is a partial sectional view with the extruded steel slug partially broken away showing the body resulting from the second stage extrusion operation; Figure 5 is a partial sectional view showing a third stage extrusion die and cooperating punch for forming a pocket in the bottom of the tubular member resulting from the operation shown in Figures 3 and 4; Figures 6 and 7 are partial sectional views showing the draw die and cooperating arbor used in forming the undercut groove on the inner wall surface of the valve lifter body; and Figure 8 is a sectional view of the valve lifter body as completed by the method of my invention.

In practicing the method of my invention, I extrude a solid steel slug 1 to form a tubular body having a bore coaxial therewith. The internal diameter of the bore is the same as that of the desired undercut groove, the body having a large diameter upper portion and a small diameter lower portion to form a shoulder on the outer surface for purposes more fully described hereinafter. In forming a valve lifter body of the type shown in the patent to Ellis, 2,665,669 issued January 12, 1954, it is necessary to provide an undercut groove in the body to preclude interference with the operation of the valve lifter due to accumulation of gums and varnish as is more fully described in the patent.

As shown in Figure 2, the steel slug 1 is positioned in a die 3, the diameter of the lower portion of the die cavity being that of the final valve lifter body and having a coaxial upper portion the diameter of which is larger than that of the lower portion. Upon application of pressure on the end of slug 1 by means of a punch 5 of the same diameter as that of the upper portion of the die cavity, the steel body is extruded to form a shortened body 1a having upper and lower portions of diametral sizes corresponding to those of the die cavity. As is clearly shown in Figure 2, the extrusion forms a shoulder 7 on the outer surface of the body 1a. An ejector pin 9 is used to remove the body 1a from the die cavity in the manner well known in the art.

The body 1a is then positioned in a die 11 having a cavity of such shape as to fit snugly about the body which is supported therein by its shoulder 7. The lower small diameter portion 13 of the die cavity is longer than the corresponding portion 15 on the body 1a in order to facilitate the extrusion operation shown in Figure 4.

As shown in Figure 4, a punch 17 is used in cooperation with the die 11 to extrude the body 1a into a tubular member 1b having a bore diameter the same as that of the undercut groove desired in the hydraulic valve lifter body. As shown, the body 1b entirely fills the die cavity. The body 1b is then transferred to a die 19 having a cylindrical cavity corresponding to that of the lower small diameter portion of the body and being of such depth as to surround the body to a point adjacent the shoulder 7.

As shown in Figure 5, a cooperating punch 21 of diameter smaller than that of punch 17 and the same as that of the spring pocket desired in the valve lifter body is used to extrude the body 1b to form a body 1c having a bore 23, the lower portion of which is smaller in diameter than the upper portion thus forming a shoulder 25 on the inner surface of the body 1c. In performing the operation shown in Figure 5, metal beneath the punch 21 is extruded to flow upward into the space between the punch 21 and the wall of the bore 23 formed in body 1b. The shoulder 25 resulting from such extrusion constitutes the lower wall of the undercut groove 27 of the valve lifter body 2 shown in Figure 8.

The body 1c is then positioned in a draw die 29 having a tapered lead surface 31 and a diameter equal to that of the small diameter portion 33 of the body 1c. A cooperating arbor 35 is positioned within the body 1c in the manner clearly shown in Figure 6, the diameter of the arbor being less than that of the upper portion of the bore 23 and being the same as that of the upper portion of the bore in the valve lifter body 2. As is clearly shown in Figure 7, force is applied to the arbor 35 to draw the body 1c through the aperture 32 of the die 29. The excess material of the large diameter upper portion above the shoulder 7 of the body 1c is transferred to the inner surface of the body by the application of compressing forces to drive the metal radially inward and upward. The transfer of metal to the inner bore surface forms the upper wall 37 of the undercut groove 27 and forms the body 1d with an upper bore portion which is the same diameter as that of the upper portion of the bore in the valve lifter body 2. As shown in Figure 8, the valve body 2 resulting from the draw operation of Figure 7 is provided with the undercut groove 27 and is formed in substantially the final configuration desired. Where necessary, a finish machine operation may be performed on the outer surface and upon the inner wall surface of the upper bore formed therein.

While I have described the preferred method of my invention in terms of a four-step operation, it should be understood that my method may be practiced with only three steps in that the body 1b may be obtained by extrusion of the body 1 in die 11 directly, the initial extrusion operation shown in Figure 2 being omitted. Similarly, the spring pocket 39 may be omitted by eliminating the extrusion operation shown in Figure 5. These and other embodiments which may be obvious to those skilled in the art from the foregoing description are within the intended scope of my invention as covered by the claims which follow.

I claim:

1. The method of forming a valve lifter body having an undercut bore portion comprising the steps of positioning a solid metal slug in a die, extruding the slug to form a tubular body having a bore closed at the lower end and having a small outside diameter lower portion and a large outside diameter upper portion to form a shoulder on its outer surface positioned between the closed lower end of the bore and the open upper end of the body, positioning a cooperating punch within the bore of said body and substantially concentric therewith, the diameter of the punch being smaller than the diameter of the bore, extruding the bottom of said body to form a spring pocket therein of smaller diameter than that of said bore and to form a shoulder on the inner wall surface of said body between the bottom of the spring pocket and the shoulder on the outer wall surface of the body, positioning the tubular body in a draw die having an aperture diameter substantially equal to the diameter of the lower portion of the body, and drawing the body through the draw die aperture to transfer the excess metal above the shoulder formed on the outer surface of the body to the interior of the body thus forming an undercut groove in the bore.

2. The method as set forth in claim 1 including the steps of positioning a mandrel within and spaced apart from the wall of the bore and upon the shoulder formed on the inner wall surface of the body to enable the body to be drawn through the draw die, the transferred excess metal filling the annular space between the bore wall and the mandrel to form an upper bore portion of the desired final diameter.

References Cited in the file of this patent

UNITED STATES PATENTS 2,642,647     Culhane _____ June 23, 1953

FOREIGN PATENTS 15,952     Great Britain _____ 1887